United States Patent [19]
McManus

[11] Patent Number: 5,167,940
[45] Date of Patent: Dec. 1, 1992

[54] PROCESS AND APPARATUS FOR REMOVAL OF H₂S FROM A PROCESS GAS INCLUDING POLYVALENT METAL REMOVAL AND DECOMPOSITION OF SALTS AND COMPLEXES

[75] Inventor: Derek McManus, Roselle, Ill.

[73] Assignee: ARI Technologies Inc., Palatine, Ill.

[21] Appl. No.: 630,824

[22] Filed: Dec. 20, 1990

[51] Int. Cl.⁵ .......................................... C01B 17/00
[52] U.S. Cl. .......................... 423/244.09; 423/140; 423/154; 423/236; 423/563; 423/567 A
[58] Field of Search .......... 423/140, 141, 154, 242 A, 423/242 R, 236, 563, 567 A, 567 R, 578

[56] References Cited

U.S. PATENT DOCUMENTS

| | | | |
|---|---|---|---|
| 3,773,662 | 11/1973 | Urban | 210/50 |
| 3,941,875 | 3/1976 | Tsuruta | 423/571 |
| 4,009,251 | 2/1977 | Meuly | 423/573 G |
| 4,013,430 | 3/1977 | Adachi | 55/37 |
| 4,091,074 | 5/1978 | Gorai | 423/235 |
| 4,098,886 | 7/1978 | Nicklin | 423/226 |
| 4,387,084 | 6/1983 | Brandenburg et al. | 423/567 A |
| 4,565,678 | 1/1986 | Zielke | 423/235 |
| 4,622,212 | 11/1986 | McManus | 423/226 |
| 4,654,148 | 3/1987 | Baker | 210/766 |

OTHER PUBLICATIONS

"Treating hydrogen sulfide: An alternative to Claus" by L. C. Hardison; Chemical Engineering, Jan. 21, 1985 by McGraw-Hill Inc.
"Unit Operations of Chemical Engineering" by McCabe and Smith; McGraw-Hill Inc. (1956) p. 580.
"Grant and Hackh's Chemical Dictionary" 5th ed. by Roges and Claire Grant, p. 37.

Primary Examiner—Gary P. Straub
Assistant Examiner—Timothy C. Vanoy
Attorney, Agent, or Firm—Marshall, O'Toole, Gerstein, Murray & Bicknell

[57] ABSTRACT

A method and apparatus for treating a catalytic polyvalent metal redox absorption solution, after absorption of H₂S from a gas, in a first hydrothermal treatment, to separate the polyvalent metal, for example as a polyvalent metal sulfide precipitate, and thereafter treating the redox solution in a higher temperature hydrothermal treatment to decompose thiosulfate salts and, if present, thiocyanide and other cyanide salts and metal-cyanide complexes to decompose the salts and complexes to molecules that can be treated in the H₂S-absorption process for recovery of sulfur and alkali values.

13 Claims, 2 Drawing Sheets

PROCESS AND APPARATUS FOR REMOVAL OF H₂S FROM A PROCESS GAS INCLUDING POLYVALENT METAL REMOVAL AND DECOMPOSITION OF SALTS AND COMPLEXES

FIELD OF THE INVENTION

The present invention is directed to a method and apparatus for selectively removing H$_2$S gas from a process gas stream using a polyvalent metal catalyst solution, such as an iron chelate absorption solution, e.g. the ARI Technologies Inc. LO-CAT® solution, or a vanadium-based, e.g. sodium vanadate, absorption solution together with an anthraquinone disulfonate (ADA), such as that used in the Stretford process, to react the H$_2$S gas selectively from the process gas stream to form elemental sulfur More particularly, the present invention is directed to a method and apparatus for removing H$_2$S from a process gas using a polyvalent metal redox absorption solution, such as an iron chelate catalytic solution or a metal vanadate catalytic solution and removing polyvalent metal sulfide from the solution by hydrothermal precipitation—and thereafter treating the polyvalent metal redox solution in a higher temperature hydrothermal salt decomposition treatment to decompose thiosulfates and, if present, cyanide salts and cyanide complexes. The hydrothermal treatments of the present invention for precipitation of polyvalent metal as sulfides and for removal of thiosulfates and, optionally, cyanide salts and complexes are useful for H$_2$S removal process that uses a polyvalent metal redox absorption solution in two valance states for absorption of H$_2$S, and regeneration of the polyvalent metal redox solution, with or without other impurities, and is particularly effective for the removal of H$_2$S and HCN from a process gas without requiring a separate pre-treatment step for HCN removal before absorption of the H$_2$S by the polyvalent metal redox catalytic solution.

BACKGROUND OF THE INVENTION AND PRIOR ART

Two of the most widely used processes for removal of H$_2$S from process gas streams are the redox processes that use 1) an iron chelate absorption solution, e.g. LO-CAT®, and 2) a vanadium-based redox absorption solution, e.g. the Stretford process. The oxidation-reduction reactions that permit these processes to be carried out continuously are well known to those skilled in the H$_2$S removal art and are well documented in the literature. The ferric iron chelate-H$_2$S reactions can be represented as follows:

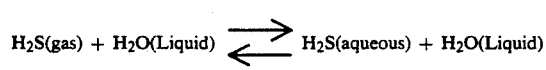

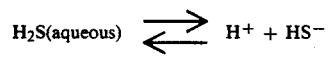

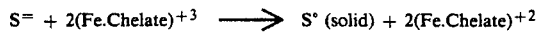

By combining these equations, the resulting equation is:

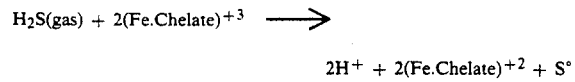

In order to have an economical, workable process to effect catalytic oxidation of the hydrogen sulfide using iron as the polyvalent metal, it is essential that the hydrogen sulfide gas be brought continuously into intimate contact with an iron chelate redox solution and that the ferrous iron chelate formed in the above described manner be continuously regenerated by oxidizing to ferric iron chelate by intimate contact with dissolved oxygen, preferably from ambient air. The series of reactions that take place when regenerating the required ferric iron chelate can be represented by the following equations:

$$O_2(gas) + 2H_2O \rightleftharpoons O_2(aqueous) + 2H_2O$$

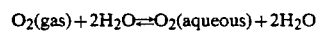

By combining these equations, the resulting equation is:

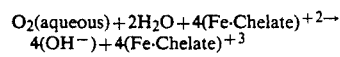

The economics and workability of the Stretford process have depended upon a large volume of the vanadium solution, and that the reduced metal vanadate, after absorption of the H$_2$S (as HS$^-$ and S$^=$) to form the metal vanadate in the +4 valance state is continuously regenerated to the +5 valance state by contact with dissolved oxygen for further use of the oxidized metal vanadate in an absorption zone of the process to remove additional H$_2$S as elemental sulfur, by which hydrogen sulfide gas is converted to elemental sulfur and water. The Stretford process chemistry is typically summarized according to the following steps:

Absorption and dissociation of H$_2$S into alkali:

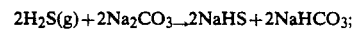

Bisulfide oxidation with metavanadate to form elemental sulfur and reduced vanadium:

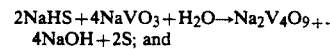

Vanadium reoxidation by dissolved molecular oxygen in the presence of ADA:

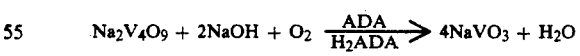

It is evident from the foregoing equations that theoretically two moles of ferric iron chelate or V$^{+5}$ redox solution must be supplied to the absorption zone in which the hydrogen sulfide gas is oxidized to form elemental sulfur for each mole of hydrogen sulfide gas treated, and in actual practice considerably more than the theoretical amount of ferric iron chelate or V$^{+5}$ redox absorption solutions are used. In a continuous process of removing hydrogen sulfide by contact with a catalytic ferric iron chelate solution or a metal vanadate (V$^{+5}$) solution, catalytic solution is circulated continuously between an absorber zone, where the H$_2$S is absorbed by the catalytic ferric iron or metal vanadate ($V^{+5}$) solution, and the polyvalent metal redox solution is reduced to ferrous iron or $V^{+4}$ in an oxidizer zone where the ferrous iron chelate solution or reduced $V^{+4}$ solution is oxidized back to the ferric iron or $V^{+5}$ state. Accordingly, either high concentrations of chelated iron or metal vanadate absorption solution is employed in the catalytic solution, or the rate of circulation has been high to assure that sufficient catalytic metal is present for substantially complete absorption of the $H_2S$ (as $HS^-$ or $S^=$).

A great many prior art patents are directed to the removal of $H_2S$ using catalytic polyvalent metal redox solutions, such as an iron chelate or a metal vanadate. Examples of the prior art patents directed to the use of polyvalent metal chelate solution for $H_2S$ removal include the following U.S. Pat. Nos.: Hartley, et al. 3,068,065; Sibent, et al. 3,897,219; Salemme 3,933,993; Meuly 4,009,251; Mancini; et al. 4,011,304; Thompson 4,189,462; Hardison 4,238,462; Blytas, et al. 4,356,155; Hardison 4,482,524; McManus, et al. 4,622,212; Primach, et al. 4,455,287; Fong, et al. 4,664,902 and 4,705,676.

One of the most significant problems in the removal of $H_2S$ gas using a polyvalent metal redox absorption chelate solution, particularly either an iron chelate redox absorption solution or a vanadium-based redox absorption solution, is that the efficiency of the redox reactions required of polyvalent metal chelate solutions is somewhat pH dependent. It is well known that polyvalent metal redox solutions are capable of solubilizing the contaminant metal ions at a pH well above pH 7, but the speed of the redox reactions decreases substantially with decreasing pH, despite statements in issued patents to the effect that a broad range of pH is acceptable—e.g. see Hartley 3,068,065; Pitts, Jr., et al. 3,097,925; Meuly, et al. 3,226,320; Roberts, et al. 3,622,273. Others have recognized that periodic addition of alkali is needed to maintain a suitably high pH for redox reaction efficiency—e.g. see Roberts et al. 3,622,273, since the pH tends to drop as the reactions proceed.

As described in the Meuly U.S. Pat. No. 4,009,251, it is recognized that the pH of polyvalent metal redox solutions is lowered during the $H_2S$ removal (absorption) reactions because of other side reactions between the chelate solution and the $H_2S$ and the resulting formation of salts formed by polyvalent metal reactions with contaminants dissolved in the polyvalent metal solution after significant contact with the process gas. When $H_2S$ is the only significant contaminant in the process gas, these side reaction products, as recognized in the Meuly U.S. Pat. No. 4,009,251, are for the most part oxides of sulfur represented by the formula $S_xO_y$, where x is generally 1 or 2 and y is generally 3 or 4, that are present in an alkali-containing polyvalent metal redox solution as sulfites, sulfates and thiosulfates. If additional reactive contaminant ions are dissolved into an alkali-containing polyvalent metal redox solution from the process gas, for example, if HCN is a significant component in the process gas, thereby providing cyanide ions, $CN^-$, in the polyvalent metal redox solution, a great many additional side reaction product salts are formed in the polyvalent metal redox solution, particularly side reaction products such as complexes between the polyvalent metal of the redox solution and the cyanide ions; and side reaction products between sulfur compounds (such as thiosulfate, polysulfides and elemental sulfur) sulfide ions and cyanide ions to form thiocyanates and complex metal cyanide complexes.

The more salts that are formed in the polyvalent metal redox solution as a result of a relatively high pH, e.g. above 7, and particularly between about 8 and 9.5, the more frequently it is necessary to add alkali periodically to maintain the desired relatively high pH. As a result, more salts are formed in the polyvalent redox solution, thereby requiring a periodic "blowdown" of polyvalent metal redox solution (a term used to denote the irretrievable discarding of some or all of the polyvalent metal redox solution and replacement with fresh, non salt-contaminated solution). Since the polyvalent metal redox solutions are relatively expensive, the efficiency of the redox reactions catalyzed by polyvalent metal redox solutions at a relatively high pH must be balanced by the expense of the addition of alkali and the expense of lost solution because of "blowdown" being necessary periodically to maintain the redox solution salt concentration below an acceptable level. Further, the sulfur salts formed necessarily reduce the elemental sulfur yield from the $H_2S$ removal process.

One method disclosed useful to substantially inhibit salt formation in a polyvalent metal redox solution in a process for the catalytic removal of $H_2S$ from a process gas is disclosed in the Meuly U.S. Pat. No. 4,009,251, using particular polyvalent metal chelating agents to inhibit oxidation of sulfur beyond elemental sulfur.

Some of the most troublesome salts formed in the absorption chamber of a polyvalent metal redox absorption solution process for selective removal of both $H_2S$ and HCN impurities from a process gas that heretofore have dictated that the HCN be removed from the gas before polyvalent metal redox absorption of $H_2S$ are, for example, thiocyanates, and various complexes between the polyvalent metal of the redox solution and cyanide ions, e.g. $[Fe(CN)_6]^{-4}$ and $[Fe(CN)_6]^{-3}$ which remain in the solution as contaminants. The hydrothermal decomposition of thiosulfates and sulfur-cyanide salts, e.g. $SCN^-$, and the polyvalent metal-cyanide complexes, particularly the polyvalent metal-cyanide complexes $[Fe(CN)_6]^{-4}$ and $[Fe(CN)_6]^{-3}$, permits the process of the present invention to treat a process gas containing both $H_2S$ and HCN. This hydrothermal decomposition is made possible by pre-treating the polyvalent metal redox solution in the hydrothermal polyvalent metal precipitation process of the present invention to precipitate the metal as, for example, a polyvalent metal sulfide from the polyvalent metal redox solution, prior to high temperature salt and complex decomposition, to prevent the metal sulfides from fowling the hydrothermal reactor and redox solution pre-heating devices, e.g. heat exchangers.

SUMMARY OF THE INVENTION

The present invention is directed to a method and apparatus for treating a catalytic polyvalent metal redox absorption solution, after absorption of $H_2S$ from a gas, in a first hydrothermal treatment, to precipitate the polyvalent metal, for example as polyvalent metal sulfides, and thereafter treating the redox solution in a higher temperature hydrothermal treatment to decompose thiosulfate salts and, if present, thiocyanide and other cyanide salts and metal-cyanide complexes to decompose the salts and complexes to molecules that can be treated in the $H_2S$-absorption process for recovery of sulfur and alkali values. Accordingly, the two hydrothermal treatments of the present invention will prevent substantial thiosulfate salts and other salt buildup in a catalytic polyvalent metal redox solution.

In accordance with one important embodiment of the present invention, it has been found gas streams containing both $H_2S$ and HCN components can be treated in the same polyvalent metal redox process, without a separate pre-treatment step for removal of HCN, to achieve an increased sulfur yield by first removing the polyvalent metal from the polyvalent metal redox solution, and thereafter converting sulfur by-product salts into elemental sulfur. The salts and complexes decomposed in the hydrothermal decomposition treatment of the present invention can be recycled to the polyvalent metal redox $H_2S$ absorption process for sulfur recovery and, optionally, for polyvalent metal recovery, thereby increasing sulfur yield and eliminating the need to periodically replace salt-contaminated polyvalent metal redox solution with costly catalytic solution. The salts that are dissolved in the catalytic polyvalent metal redox solution in the absorption zone of the process are decomposed from the solution in the hydrothermal converter, without oxygen added to the hydrothermal converter, by a simple decomposition reaction of the thiosulfate and sulfite and, if present, the cyanide salts and cyanide complexes at a sufficiently high pressure and temperature to decompose the salts and complexes. The decomposition treatment, in accordance with the present invention, is particularly advantageous where the process gas contains cyanides, since the hydrothermal treatment will decompose the cyanide salts and cyanide complexes dissolved in the polyvalent metal redox solution in the absorber. Quite unexpectedly, it has been found that suitably high temperature and pressure combinations, for example, at a temperature above about 400° F., preferably in the range of about 600° F. to about 700° F. and pressures of at least about 1,000 psig., preferably about 1,500 psig. to about 2,500 psig., e.g. 2,000 psig., in a hydrothermal converter, without the addition of oxygen will enable the thiosulfate, thiocyanate and/or cyanide salts, particularly thiocyanates and cyanide complexes that have accumulated in the polyvalent metal redox solution in the absorption zone to decompose via hydrothermal conversion. The decomposition products of the salts can be sent back to the absorber or oxidizer of the $H_2S$-removal process, together with the treated polyvalent metal redox solution, for conversion of the newly formed polyvalent metal precipitates, e.g. sulfides, and polysulfides, to sulfur, and to prevent losses of polyvalent metal redox solution, thereby achieving more complete sulfur recovery.

The reaction in the hydrothermal converter appears to be a reaction between a sulfur or cyanide molecule entering the converter, and a water component, e.g. hydrogen, hydroxyl ions, oxygen or hydrogen and/or oxygen ions or hydrogen ions. This seems to be the case since ammonia is formed in some cases in the converter without hydrogen entering the converter except for hydrogen present in the water entering the converter. Accordingly, the hydrothermal converter is useful in accordance with the present invention for decomposition of any type of sulfur of cyanide compounds as well as reactions of sulfur and/or cyanide compounds with a water component to form any type of theoretically possible reaction products of sulfur or cyanide with hydrogen, oxygen and/or hydroxyl radical or molecules.

In accordance with another new and unexpected feature of the present invention, substantially all of the thiosulfate salt, cyanide salts, particularly thiocyanates, and cyanide complex decomposition products recovered from the hydrothermal converter can be oxidized in the oxidizer zone of the polyvalent metal redox process and apparatus of the present invention, without substantial buildup of salts in the polyvalent metal redox solution. While some of the polyvalent metal redox solution can be replaced periodically if an unusually high process gas contamination concentration is encountered on occasion, in accordance with a preferred embodiment of the present invention, periodic replacement of catalytic polyvalent metal redox solution should not be necessary in the steady state operation of the process and apparatus of the present invention using a hydrothermal converter for salt control in the polyvalent metal redox solution. The hydrothermal converter can be operated on a continuous basis or can be used periodically to clean an aliquot of polyvalent metal redox solution as an alternative to discard of solution via "blowdown."

Accordingly, one aspect of the present invention is to provide a new and improved method and apparatus for controlling or eliminating salt buildup in a catalytic polyvalent metal redox solution used in selective removal of $H_2S$ from $H_2S$-contaminated process gas streams.

Another aspect of the present invention is to provide a new and improved method and apparatus for controlling or eliminating salt buildup in a catalytic polyvalent metal redox solution used in selective removal of both $H_2S$ and HCN-contaminated process gas streams.

Another aspect of the present invention is to provide a new and improved method and apparatus for removing polyvalent metal-sulfur compounds from a catalytic polyvalent metal redox solution and thereafter hydrothermally converting salts and complexes in the remaining solution into smaller molecules capable of processing in the $H_2S$-removal process for recovery of sulfur, and to avoid costly losses of catalytic polyvalent metal redox solution in a process and apparatus for removing $H_2S$ or $H_2S$ and HCN from a process gas.

Still another aspect of the present invention is to provide a new and improved method and apparatus for hydrothermally precipitating polyvalent metal salts, such as sulfides from a catalytic polyvalent metal redox solution, and thereafter, at a higher temperature, hydrothermally decomposing thiosulfate and/or cyanide salts, such as thiocyanates, and/or cyanide complexes, to avoid loss of costly polyvalent metal redox solution due to excessive salts and/or inactivity due to polyvalent metal losses.

A further aspect of the present invention is to provide a method and apparatus for hydrothermally reacting a sulfur or cyanide-containing compound with a water component to form reaction products, anaerobically at high temperature and pressure without adding hydrogen or oxygen gas to the converter for removal of the sulfur and/or cyanide.

BRIEF DESCRIPTION OF THE DRAWINGS

The above and other aspects and advantages of the present invention will become apparent from the following detailed description of the present invention wherein.

DETAILED DESCRIPTION OF THE PREFERRED EMBODIMENTS

Figure 1:
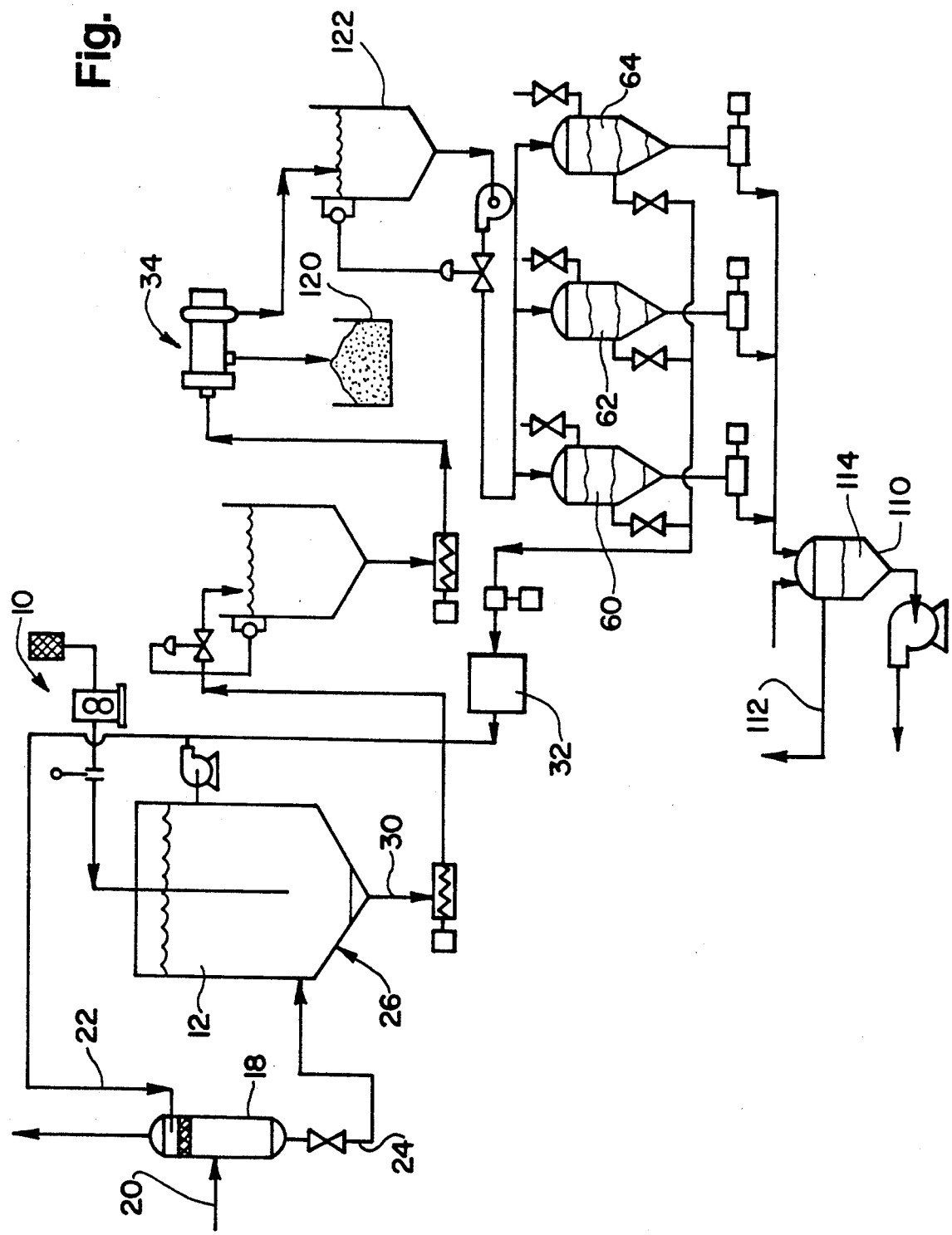
FIG. 1 is a schematic side view of the process and apparatus of the present invention.

The present invention is directed to a method and apparatus for treating an $H_2S$ containing gas stream to avoid substantial thiosulfate salts and other salt buildup in a catalytic polyvalent metal chelating solution, and more particularly, to a method of treating gas streams containing both HCN and $H_2S$ concurrently for destruction of the thiosulfate, thiocyanate and cyanide salts, and metal cyanide complexes, and conversion of $H_2S$ and decomposed salts and complexes to elemental sulfur.

The method and apparatus of the present invention is particularly useful for removal of $H_2S$ and HCN from a coke oven gas. Coke oven gas is produced by roasting coal in anaerobic ovens to produce a solid product suitable for use as a reducing agent for iron oxide in blast furnaces This gas ordinarily contains carbon monoxide, hydrogen and hydrocarbon gases as principal ingredients, and usually contains HCN and $H_2S$ as impurities. A typical coke oven gas contains about

|  | ppm | gr/100 SCF |
|---|---|---|
| $H_2S$ | 5000 | 314 |
| HCN | 1000 | 50 |

It is necessary to remove the $H_2S$ from the COG to prevent the emission of $SO_x$ from various combustion devices in which the gas is used as a fuel. A typical steel plant coke oven produces about 100 MMSCFD of gas, which would result in the emission of about 15,000 ton/year of $SO_2$.

The $H_2S$ is usually removed by a wet scrubbing process. Regenerable alkaline solutions absorb the $H_2S$ and strip it out of the solution at a high enough concentration to use a conventional Claus process for conversion to $H_2S$.

Other catalytic polyvalent metal redox $H_2S$ removal processes, such as the Stretford process or LO-CAT® process, usually have removal of the HCN in a separate scrubbing stage before the gas enters the absorber. This is because the HCN in the gas stream reacts with sulfur and the alkaline salts in the solution to form an alkali metal or an alkaline earth metal thiocyanate, such as NaSCN, or $NH_4SCN$, and various complexes between the polyvalent metal redox solution and cyanide ions, e.g. $[Fe(CN)_6]^{-4}$ and $[Fe(CN)_6]^{-3}$ which remain in the solution as contaminants. Purging solution to remove the $SCN^-$ and polyvalent metal-cyanide complexes to hold an acceptable concentration of, e.g. 20% to 30% by weight salts would require discard of an excessive quantity of the active polyvalent metal catalyst ingredients.

In accordance with the present invention, it has been found that sulfite and thiosulfate salts and cyanide salts and metal cyanide complexes accumulated in the catalytic polyvalent metal redox solution in a process for converting $H_2S$ to sulfur, e.g. using iron chelate or vanadium-based redox solutions, can be removed from the redox absorption solution by treating the redox solution at high temperature and pressure in a simple reactor without the addition of air or any other chemical oxidizing or reducing agent, to decompose the thiosulfates to $H_2S$, NaHS and $Na_2SO_4$, after removal of the polyvalent metal from the solution.

In accordance with an important feature of the present invention, it has been found that the catalytic polyvalent metal redox solution can be hydrothermally treated at a temperature sufficient to precipitate the catalytic polyvalent metal sulfides, but insufficient to decompose the thiosulfates or cyanide salts or cyanide complexes that may be present in the redox absorption solution, thereby avoiding the formation of a polyvalent metal sulfide precipitate in the hydrothermal decomposition step. Suitable temperatures and pressures sufficient to precipitate the catalytic polyvalent metal sulfides (iron sulfides and/or vanadium sulfides), with the addition of an $S^=$ reactant, are, for example, in the range of about room temperature to about 150° F., and pressures of at least about 50 psig., e.g. about 50 to about 150 psig., to allow metal sulfide settling, if cyanide salts or cyanide complexes are not present in the polyvalent metal redox solution; and, for example, temperatures of about 300° F. to about 400° F. and pressures of about 50 to about 1,000 psig. when cyanide salts and/or cyanide complexes are present in the polyvalent metal redox solution. The preferred hydrothermal polyvalent metal precipitation conditions are 350° F. and 100 psig, for a period of about 1 hour. The pressure is not critical and should be high enough to prevent the chelate solution from boiling at the temperature employed.

The vessel used for hydrothermal polyvalent metal sulfide precipitation can be a simple reaction vessel capable of withstanding the conditions of temperature and pressure used, including a solid sludge precipitate outlet at the bottom of the vessel, and a redox solution outlet disposed above a sludge accumulation level.

Precipitation of the polyvalent metal sulfides can be accomplished, for example, using one or more relatively inexpensive vessels charged with polyvalent metal redox solution at different times to maintain continuous treatment while allowing sufficient time, e.g., about 30 minutes to 4 hours, preferably about 1 hour, for complete polyvalent metal sulfide precipitation. Generally, the hydrothermal precipitation vessels are charged with steam, e.g., 100 psig. steam, and allowed sufficient time to heat up to temperature prior to reaction, which is completed in a time period of about 30 minutes to about 1 hour, and then the vessel is depressurized by allowing the gas to vent the absorption vessel. The polyvalent metal sufide then is allowed a sufficient time for the precipitate to completely settle from the polyvalent metal redox solution, e.g., 2 to 4 hours, and the polyvalent metal sulfide sludge is pumped from the vessel. The polyvalent metal redox solution remaining in the precipitation vessel then is fed to the hydrothermal decomposition reactor for thiosulfate and cyanide salt and cyanide complex decomposition at a higher temperature, above 400° F., e.g., 400° F.+to abut 700° F., preferably about 600° F. to about 650° F.

The polyvalent metal sulfide pumped from the vessel can be discarded, or reacted with acid in a separate vessel for formation of $H_2S$ gas that is conveyed to the absorber or oxidizer for recovery of sulfur, and the polyvalent metal salt solution can be rechelated.

Substantially complete conversion of $Na_2S_2O_3$ is achieved in accordance with the hydrothermal conversion process of the present invention.

The decomposition products can be returned to the Stretford or LO-CAT® absorber unit to recover the sulfur as product and use the Na+ to help maintain alkalinity. The sulfate component is not useful and can be purged or further processed. The decomposition products processed in the catalytic polyvalent metal chelate $H_2S$ removal process for conversion to sulfur, also provide alkaline values so that it is not necessary to add replacement NaOH or other alkali periodically to keep the alkalinity of the chelate solution at a level high enough for efficient conversion of $H_2S$ to sulfur.

The hydrothermal converter process step for decomposition of salts and complexes of the present invention is particularly well suited to treating a process gas containing both $H_2S$ and HCN without requiring a separate HCN-removal pretreatment step since the hydrothermal treatment will also decompose sulfur-cyanide salts, e.g. $SCN^-$, and polyvalent metal-cyanide complexes, particularly the polyvalent metal-cyanide complexes $[Fe(CN)_6]^{-4}$ and $[Fe(CN)_6]^{-3}$, and decomposes these contaminants to materials that can be converted back to sulfur by reaction with oxidized catalytic polyvalent metal redox solution while recovering alkali values.

In accordance with a preferred embodiment of the present invention it has been found that the NaSCN or $NH_4SCN$ salts formed by catalytic oxidation of $H_2S$ to sulfur by contact with a polyvalent metal redox solution can be decomposed hydrothermally under conditions of high pressure—of at least about 1,000 psig, and preferably at least about 1,500 psig, particularly within the range of about 1,500 to about 2,500 psig, e.g. about 2,000 psig—and a high temperature of at least about 400° F., and preferably in the range of about 600° F. to about 700° F., e.g. about 650° F., in a simple anaerobic reactor without the addition of oxygen or any other chemical reagent. This was quite unexpected and seems to be unknown so far as chemical literature is concerned.

Under the conditions described, 90% conversion can be obtained in about one hour residence time at temperature.

In accordance with a very significant feature of the present invention, substantially all of the hydrothermal converter reaction products are suitable for return to the LO-CAT® or Stretford plant, and need not be discarded at all. By blending the effluent with a substantial excess of oxidized catalytic polyvalent metal redox solution, the sulfide and polysulfide ions contained in the effluent are converted to elemental sulfur and the alkaline values are recovered so that it is not necessary to add replacement NaOH, or other alkali to keep the alkalinity of the solution at a relatively high level, e.g. pH 8.0 to 9.5. Under the conditions described, the polyvalent metal-cyanide complexes also are decomposed, liberating $NH_4^+$, $HCO_3$ and FeS or $FeS_2$. The efficiency of decomposition of $[Fe(CN)_6]^{-4 \text{ or } -3}$ complexes under the conditions described was generally at least about 80% by weight, and sometimes in excess of 99%.

Turning now to the drawings, and initially to FIG. 1, there is illustrated a process and apparatus, generally designated by reference numeral 10, for the polyvalent metal catalyzed removal of $H_2S$, or both $H_2S$ and HCN from a process gas, such as coke oven gas. A process gas that contains $H_2S$, or $H_2S$ and HCN, in the polyvalent metal redox solution 12 from a process gas stream, is directed into a suitable gas-liquid contact device, or absorption tower 18, through process gas inlet conduit 20 for intimate contact and mass transfer with a countercurrently downwardly flowing polyvalent metal redox absorption solution entering an upper portion of the absorber 18 through liquid inlet conduit 22. The absorption tower can include any means for establishing intimate contact between liquid and gas, such as bubble cap trays, Rachig rings or other packing materials. In the absorber 18, the $H_2S$ from the process gas is absorbed by the polyvalent metal redox catalyst solution and some dissolved polyvalent metal sulfide and thiosulfates accumulate in the redox solution rendering the redox absorption solution less active. If the process gas stream also contains HCN, sulfur-cyanide salts, such as thiocyanides, and polyvalent metal-cyanide complexes, e.g. $[Fe(CN)_6]^{-4 \text{ or } -3}$ also form in the polyvalent metal redox solution within the absorber 18.

In accordance with the present invention, the polyvalent metal sulfides can be removed from the redox solution by precipitation in a hydrothermal treater under conditions insufficient to decompose any significant amount of thiosulfate, cyanide salts or cyanide complexes dissolved in the redox solution, to avoid the precipitation of polyvalent metal sulfides at some disadvantageous point in the process Further, by separating the polyvalent metal sulfides in a vessel separate from the absorber and oxidizer vessels or zones of the process, the sulfur values, alkali values and the polyvalent metal salts can be recovered to increase the sulfur yield.

As shown in FIG. 1, the $H_2S$-laden and salt-laden polyvalent metal redox absorption solution from the absorber 18 is directed along conduit 24 into an oxidizer vessel, generally designated by reference numeral 26, where an oxygen-containing gas, e.g. air, is pumped through a sparger (not shown) in countercurrent flow to the catalytic polyvalent metal redox solution 12, in finely divided bubbles, to convert the $H_2S$ to sulfur, recovered at the bottom of oxidizer 26 in conduit 30, and to reoxidize the metal redox solution, e.g. to $Fe^{+3}$ or $V^{+5}$, so that the polyvalent metal redox solution is capable of absorbing additional $H_2S$ in the absorber 18. The redox solution can be hydrothermally treated either before of after oxidation, preferably before oxidation to lessen the amount of $S^=$ needed for precipitation. Optionally, and preferably, the redox solution remaining after polyvalent metal sulfide precipitation then is processed in a high temperature hydrothermal decomposition process to decompose the thiosulfate salts, cyanide salts and cyanide complexes remaining in the catalytic polyvalent metal redox solution.

As shown in FIG. 3, the catalytic polyvalent metal redox solution can be hydrothermally treated at a temperature sufficient to precipitate the catalytic polyvalent metal sulfides, but insufficient to decompose the thiosulfates, cyanide salts and cyanide complexes that may be present in the polyvalent metal redox solution, thereby avoiding the formation of a polyvalent metal sulfide precipitate in the hydrothermal decomposition apparatus. The preferred hydrothermal sulfide precipitation conditions are 300° F. and 100 psig., for a period of about 1 hour. The pressure is not critical and should be high enough to prevent the polyvalent metal redox solution from boiling at the temperature employed.

Figure 2:
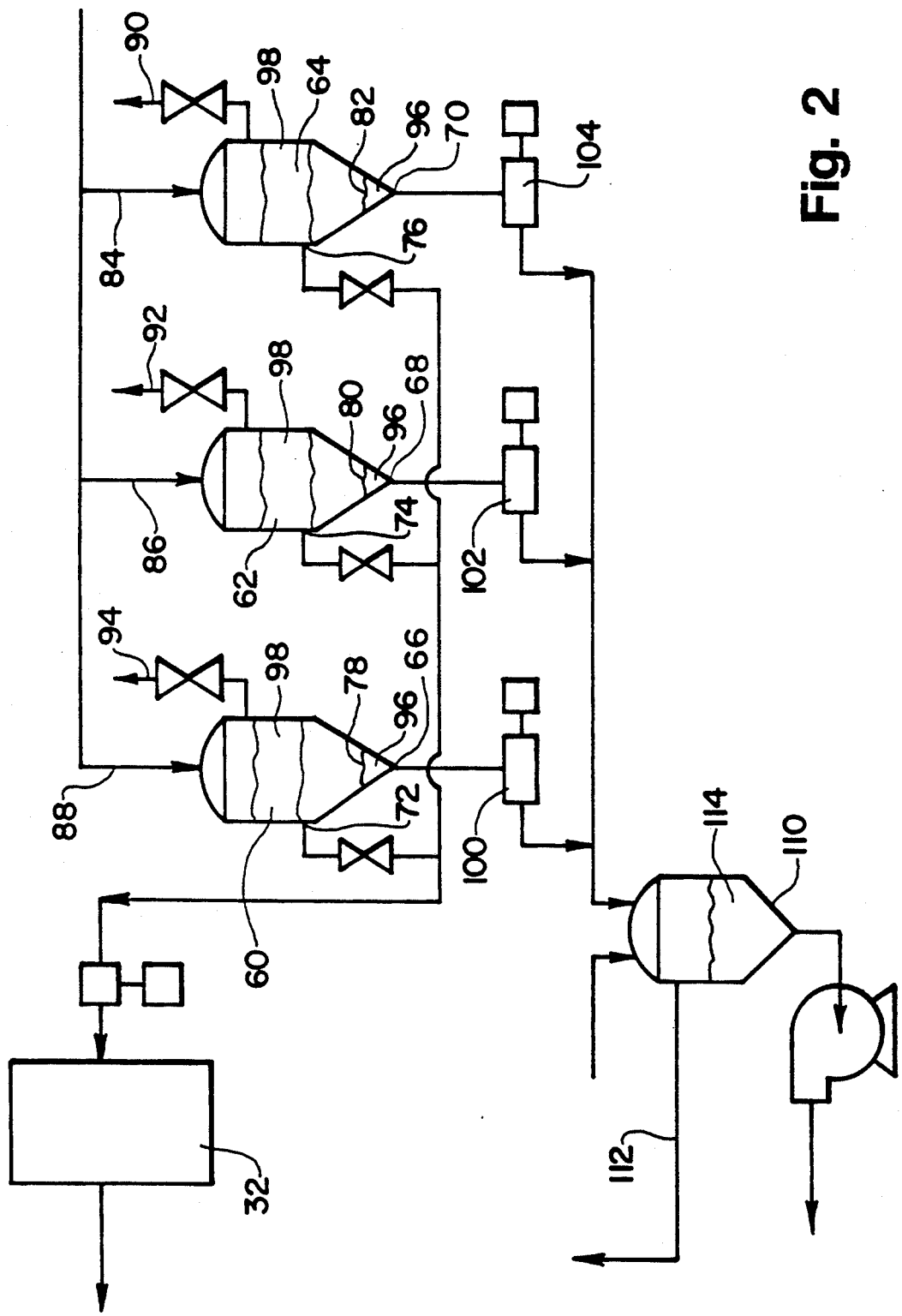
FIG. 2 is a schematic side view of a polyvalent metal sulfide hydrothermal treater portion of the apparatus and process of the present invention, for precipitation of polyvalent metal salts, e.g. sulfides, $FeS_x$, where $x = 1-6$, with an average of about 3, from the catalytic polyvalent metal redox absorption solution.

As shown in FIG. 2, the vessel used for hydrothermal polyvalent metal sulfide precipitation, 60, 62 and/or 64, can be a simple, inexpensive reaction vessel capable of withstanding the conditions of temperature and pressure used, e.g., 300° F. and 100 psig., and including a solid sludge precipitate outlet, 66, 68 or 70, respectively, at the bottom of each vessel, and a chelate solution outlet 72, 74 or 76 disposed above a sludge accumulation level of 78, 80, or 82 in each vessel.

Precipitation of the polyvalent metal sulfides can be accomplished, using one or more relatively inexpensive vessels 60, 62 and/or 64 charged with polyvalent metal redox solution from feed conduits 84, 86 or 88 at different times to maintain continuous treatment while allowing sufficient time, e.g., about 30 minutes to about 4 hours, for complete polyvalent metal sulfide precipitation.

To begin the precipitation of the polyvalent metal, for example, as a sulfide, e.g. FeS, the hydrothermal treater 60, 62 or 64 is charged with the polyvalent metal redox solution, and some polysulfide, $S^=$, that can be obtained from the $H_2S$ in the process gas, or can be added from an external source. If sufficient polysulfide is dissolved in the polyvalent metal redox solution from the hydrothermal converter decomposition of salts and complexes in vessel 32 as the process reaches a steady state, the addition of polysulfide, $S^=$, from the outlet stream of the converter 32 to the hydrothermal treater 60, 62 or 64 should be sufficient to provide the stoichiometric quantity of $S^=$ for complete precipitation of all polyvalent metal from the polyvalent metal redox solution in treater 60, 62 or 64 to avoid later precipitation of polyvalent metal sulfide in the hydrothermal converter used for decomposition of salts and complexes.

Generally, the hydrothermal precipitation vessels, 60, 62 or 64, are charged with steam, e.g., 100 psig. steam, and allowed sufficient time to heat up to temperatures prior to reacting for about 30 minutes to 1 hour and then the vessel is depressurized by allowing the gas to vent to the absorption vessel 18 through conduits 90, 92 and 94. The polyvalent metal sulfide then is allowed a sufficient time for the precipitate 96 to completely settle from the redox solution 98, e.g., 1 to 4 hours, and the polyvalent metal sulfide sludge 96 is pumped via pump 100, 102 or 104 from the vessel 60, 62 or 64. The polyvalent metal redox solution 98 remaining in the hydrothermal precipitation vessel then is fed to the hydrothermal converter or decomposition reactor 32 for sulfite, thiosulfate, cyanide salt and cyanide complex decomposition at a higher temperature, above 400° F., e.g., 400° F.+-700° F., preferably about 600° F. to about 650° F., as described in more detail hereinafter.

The polyvalent metal sulfide 96 pumped from the vessel 60, 62 or 64 can be discarded, or reacted with acid in a separate vessel 110 for formation of $H_2S$ gas that is conveyed to the absorber 18 or oxidizer 12through conduit 112 for recovery of sulfur, and the polyvalent metal redox solution 114 can be rechelated.

As shown in the drawings, a hydrothermal converter apparatus of the present invention 32, is disposed in a redox solution recovery conduit for treating polyvalent metal redox solution on route from a sulfur-polyvalent metal redox solution separation section of the apparatus, generally designated 34, where sulfur is directed into vessel 120 and polyvalent metal redox solution is directed into vessel 122. It should be understood, however, that the hydrothermal converter 32 can be used batch-wise to treat polyvalent metal redox solution or the treater 32 can be used at other points along the process and apparatus for hydrothermal decomposition in accordance with the present invention.

EXPERIMENTAL

Two separate batches, A and B, of catalytic iron chelate solution were treated with five times the stoichiometric requirement of sulfide ions derived from laboratory grade sodium sulfide. For batch A, 48 lb. of iron chelate solution was treated with 186.9 g $Na_2S$ (60%) dissolved in 851.7 g water. Similarly, 44.7 lb. of batch B was treated with 166.7 g $Na_2S$ (60%) dissolved in 759.4 g water.

The sulfided solutions were thermally processed using the steam jacketed hydrosulfide precipitation vessel 60, FIG. 3. FIGS. 4 and 5 illustrate the time-temperature profiles of the hydrothermal precipitator for both batches.

After cooling overnight, each batch was examined before discharge to ascertain the adequacy of precipitation. On opening the top flange after batch A had cooled, an open ended 4'×¼" glass tube was slowly lowered into the solution. When fully immersed, the top end was closed and the tube was withdrawn. A 33" column of clear supernate was observed indicating excellent sedimentation.

The cooled supernate from batch B was removed from the steam jacketed vessel as a clear, almost colorless liquid by means of a siphon tube. Essentially all the liquid could be removed in this manner indicating that not only did the iron sulfides precipitate efficiently, but also the settled volume of precipitate was small. Laboratory analytical data showed that iron removal in excess of 99.9% was achieved in both batch A and batch B.

It should be understood that the present disclosure has been made only by way of preferred embodiments and that numerous changes in details or construction, combination and arrangement of parts can be resorted to without departing from the spirit and scope of the invention as hereunder claimed.

What is claimed is:

1. A method of removing $H_2S$ from a process gas including the steps of:
    intimately contacting the process gas with an aqueous catalytic polyvalent metal redox solution to absorb the $H_2S$ into the polyvalent metal redox solution, and to form a reduced catalytic polyvalent metal redox solution;
    oxidizing the reduced catalytic polyvalent metal redox solution sufficiently to regenerate the catalytic polyvalent metal redox solution such that it is capable of absorbing $H_2S$ from said process gas;
    treating a portion of the redox solution after absorption of $H_2S$ with a source of sulfide ions in stoichiometric excess to precipitate the polyvalent metal as insoluble sulfides to separate a substantial portion of the polyvalent metal from the redox solution;
    separating the precipitated polyvalent metal sulfide from the redox solution;
    anaerobically treating the aqueous redox solution separated from the polyvalent metal sulfide precipitate, said solution containing a thiosulfate salt, without the addition of hydrogen, in a pressurized vessel, at a temperature in the range of about 400° F. to about 700° F., at a pressure of at least about 1,000 psig and for a time sufficient to decompose the thiosulfate salts in the redox solution; and
    recycling the redox solution, after thiosulfate decomposition or reaction, for recovery of sulfur and alkali.

2. The method of claim 1, wherein the polyvalent metal redox solution is heated to a temperature in the range of about 200° F. to about 400° F. at a pressure of about 50 psig to about 1,000 psig in contact with $S^=$ to precipitate the polyvalent metal from the solution.

3. The method of claim 1, wherein the thiosulfate salts are reacted with a reactant selected from the group consisting of hydrogen ions, oxygen ions, hydroxyl ions, and combinations thereof.

4. The method of claim 1 further including the step of recycling the solution, after thiosulfate salt decomposition to the absorption zone.

5. The method of claim 1, wherein the solution separated from the polyvalent metal sulfide precipitate is heated, anaerobically, to a temperature of at least about 600° F. and a pressure of at least about 1,500 psig to decompose the thiosulfate salts.

6. The method of claim 5, wherein the solution separated from the polyvalent metal sulfide precipitate is heated to a temperature in the range of about 600° F. to about 700° F. and at a pressure in the range of about 1,500 psig to about 2,500 psig to decompose a substantial portion of the thiosulfate salts.

7. The method of claim 1 further including the step of removing elemental sulfur, after intimate contact of the process gas with polyvalent metal redox solution or after oxidizing the polyvalent metal redox solution, together with a minor proportion of polyvalent metal redox solution and separating the sulfur from the polyvalent metal redox solution.

8. The method of claim 1 further including the steps of withdrawing elemental sulfur together with a minor proportion of polyvalent metal redox solution from the redox solution after absorption of $H_2S$ or after oxidation of the reduced polyvalent metal redox solution;
  separating the elemental sulfur from the polyvalent metal redox solution;
  and wherein the polyvalent metal redox solution anaerobically treated to decompose the thiosulfate salts is the polyvalent metal redox solution separated from the elemental sulfur.

9. A method of removing $H_2S$ and HCN from a process gas including the steps of:
  intimately contacting the process gas with an aqueous catalytic polyvalent metal redox solution to absorb the $H_2S$ and HCN into the polyvalent metal redox solution, and to form elemental sulfur, cyanide salts or cyanide complexes in the polyvalent metal redox solution, and simultaneously forming a reduced catalytic polyvalent metal redox solution; and
  intimately contacting the catalytic reduced polyvalent metal redox solution with an oxidizing gas capable of oxidizing the reduced catalytic polyvalent metal redox solution sufficiently to regenerate the catalytic polyvalent metal redox solution to form an oxygenated polyvalent metal redox solution capable of again absorbing said $H_2S$ and HCN from said process gas and treating a portion of the redox solution after absorption of $H_2S$ with a source of sulfide ions in stoichiometric excess to precipitate the polyvalent metal as insoluble sulfides to separate a substantial portion of the polyvalent metal from the redox solution and separating the precipitated polyvalent metal sulfide from the redox solution;
  anaerobically heating the aqueous polyvalent metal redox solution separated from the polyvalent metal sulfide precipitate containing a thiosulfate salt, after absorption of $H_2S$ and HCN at a temperature in the range of about 400° F. to about 700° F. and at a pressure of at least about 1,000 psig without the addition of hydrogen to decompose a substantial portion of the cyanide salts and cyanide complexes from the solution; and
  recycling the treated polyvalent metal redox solution, after cyanide salt decomposition for recovery of sulfur.

10. The method of claim 9, wherein the redox solution is heated to a temperature of at least about 600° F. and at a pressure of at least about 1,500 psig to decompose a substantial portion of the thiosulfate salts and cyanide salts present in the solution.

11. The method of claim 9, wherein the redox solution is heated to a temperature in the range of about 600° F. to about 700° F. and at a pressure of about 1,500 psig to about 2,500 psig.

12. The method of claim 9 further including the steps of withdrawing elemental sulfur together with a minor proportion of polyvalent metal redox solution after absorption of $H_2S$ or after oxidation of the reduced polyvalent metal redox solution;
  separating the elemental sulfur from the polyvalent metal redox solution;
  and wherein the polyvalent metal redox solution anaerobically treated to decompose the cyanide salts and cyanide complexes is the polyvalent metal redox solution separated from the elemental sulfur.

13. The method of claim 9 further including the step of recycling the redox solution, after cyanide salt and cyanide complex decomposition to the absorption zone.

* * * * *